United States Patent [19]

Evers

[11] 4,376,126

[45] Mar. 8, 1983

[54] METHOD OF MAKING A YOGHURT BEVERAGE AND PRODUCT THEREBY

[75] Inventor: Paulus H. J. M. Evers, Veghel, Netherlands

[73] Assignee: DMV-Campina B.V., Veghel, Netherlands

[21] Appl. No.: 353,570

[22] Filed: Mar. 1, 1982

Related U.S. Application Data

[63] Continuation of Ser. No. 177,577, Aug. 13, 1980, abandoned.

[30] Foreign Application Priority Data

Nov. 13, 1979 [NL] Netherlands ........................ 7908307

[51] Int. Cl.³ ........................ A23C 23/00; A23L 2/02
[52] U.S. Cl. ........................ 426/43; 426/61; 426/399; 426/401; 426/409; 426/583; 426/590; 426/599
[58] Field of Search ........................ 426/34, 42, 43, 61, 426/583, 584, 590, 599, 650, 651, 658, 399, 401, 409, 412, 519, 522, 524

[56] References Cited

U.S. PATENT DOCUMENTS

| | | |
|---|---|---|
| 3,625,702 | 12/1971 | Exler . |
| 3,969,534 | 7/1976 | Pavey et al. ........................ 426/43 X |
| 3,978,243 | 8/1976 | Pedersen ........................ 426/583 X |
| 4,110,476 | 8/1978 | Rhodes ........................ 426/583 X |
| 4,216,243 | 8/1980 | Hermann ........................ 426/583 |

FOREIGN PATENT DOCUMENTS

| | | |
|---|---|---|
| 161169 | 2/1955 | Australia ........................ 426/43 |
| 2535904 | 2/1977 | Fed. Rep. of Germany ...... 426/584 |
| 1275269 | 3/1972 | United Kingdom . |
| 588964 | 1/1978 | U.S.S.R. ........................ 426/583 |

*Primary Examiner*—Arthur L. Corbin
*Attorney, Agent, or Firm*—Scully, Scott, Murphy & Presser

[57] ABSTRACT

A method of producing a beverage from yoghurt and, optionally, fruit juice, fruit essence or fruit concentrate, having good keeping qualities. The voghurt is prepared in the conventional manner by fermenting milk until the mass has reached a pH value conventional for yoghurt, and the fermented milk is mixed as desired with minor amounts of water, sugars, pectin and flavors and/or colors and, optionally, fruit juice, fruit essence or fruit concentrate. After the mixing of the ingredients the mass is homogenized and is subsequently subjected to a heat treatment, comprising warming up to a temperature between 45° and 55° C. while the mass is being agitated and while maintaining a temperature difference between the heating medium and the mass of no more than 10° C., and then to a cooling treatment at a temperature between 25° and 35° C. At that temperature the product is again homogenized, and then pasteurized or sterilized, cooled and aseptically packed, or packed and then pasteurized or sterilized within the package.

8 Claims, No Drawings

METHOD OF MAKING A YOGHURT BEVERAGE AND PRODUCT THEREBY

This is a continuation of application Ser. No. 177,577, filed Aug. 13, 1980, now abandoned.

This invention relates to a method of producing a beverage from yoghurt and fruit juice, fruit essence or fruit concentrate having good keeping qualities.

A prior method of producing such a beverage comprises producing the yoghurt in the conventional manner by fermenting milk until the mass has reached a pH value conventional for yoghurt, and mixing the fermented milk, as desired, with water, sugars, fruit juice, fruit essence or fruit concentrate, flavours and/or colours.

Such a method is described in Dutch patent specification No. 99,203. Although it says in that specification that the resulting products have good keeping qualities, it has turned out in practice that when the product is kept at room temperature, for example at 20°-25° C., there is a clear separation of whey after some time, and a visible sedimentation can be observed sometimes after a period as short as a few weeks. This is in particular the case if the beverage contains a fruit juice or fruit essence.

According to the present invention, it has been found that a yoghurt beverage having very long keeping qualities can be produced by homogenizing the mass, using a known per se manner, after the ingredients have been mixed, and subsequently subjecting it to a heat treatment, in which the composition is warmed up to a temperature between 45° and 55° C. while the mass is being agitated, and while maintaining a temperature difference between the heating medium and the mass of no more than 10° C., subsequently cooling the mass to a temperature between 25° and 35° C., at which temperature the mass is again homogenized. Thereafter the resulting product is pasteurized or sterilized and then cooled and aseptically packed. It is also possible for the resulting product to be packed and then pasteurized or sterilized within the package. For the preparation of the yoghurt serving as the starting material, milk is preferably fermented so that the pH, measured at the usual fermentation temperature, reaches a value ranging between 3.9 and 4.5, in particular a value of 4.2 or less.

In the method according to the present invention it is of importance that the fermented milk, cooled to a temperature of between 15° and 35° C., and to which water, sugar, fruit juice, fruit concentrate or fruit essence, pectin, flavours and/or colours have been added, has a pre-determined pH value.

This pH value, measured at a temperature of 15° C., is preferably 4.1-4.2. It can be adjusted by means of a substance suitable for use in food stuffs, for example, citric acid or lactic acid. The heat treatment of the homogenized mass is preferably effected in such a manner that a temperature of 51°±0.5° C. is reached, while maintaining a temperature difference between the heating medium and the mass to be heated of no more than 10° C. In a highly suitable embodiment of the method according to the invention, during the cooling of the warmed-up mass to a temperature of 25°-35° C., in particular to a temperature between 31° and 33° C., the same temperature difference is maintained between the cooling medium and the mass as was used during the warming-up phase.

During the warming-up to pasteurization or sterilization temperature of the unpacked product, it is also preferable to maintain a temperature difference between the medium and the mass of no more than 10° C. Yoghurt beverages prepared by the method according to the present invention can be kept for at least 6 months, both as regards taste and consistency. The homogenization of the mass can be carried out, for example, by means of a pestle-type homogenizer, a colloid mill and the like.

In illustration of the invention, there will now follow 5 examples of the method according to the invention and some comparative examples.

EXAMPLE I 1000 kg milk with a fat content of less than 0.3% by weight was mixed with 70 kg saccharose and 10 kg dextrose. This mixture was successively homogenized at a pressure of 20 MPa, heated to 98° C., maintained at that temperature for 2.5 minutes, and cooled to 30° C. The resulting mixture was subsequently subjected to a fermentation with 0.25 kg IST culture, which fermentation was continued until a pH value of 4.2 was reached.

After cooling to 15° C., the pH value was checked and adjusted to a value of 4.1 by adding food-quality citric acid. The mixture was then mixed with stirring with 27 kg water, in which were dissolved 2.2 kg citrous pectin and 3.5 kg orange essence. After intensive stirring, the mixture was homogenized at a pressure of 20 MPa, and then warmed up to a temperature of 51° C. in a suitable heat exchanger, while agitating the mass and using a temperature difference between the heating medium and the product of no more than 5° C.

Immediately after this temperature of 51° C. was reached, which was accurately checked, the mixture was cooled to 32° C., with the ΔT between the cooling medium and the mass being no more than 5° C. At the temperature of 32° C., the mixture was again homogenized at a pressure of 20 MPa, whereafter the mass was heated to 90° C. and kept at this temperature for 30 seconds while being agitated, and using a temperature difference between the mass and the heating medium of no more than 5° C. Finally the product was cooled to 22° C. and aseptically packed at this temperature. The germ count of the packed yoghurt drink was immediately after packing 90 germs/ml. The product was stored in the sealed package at room temperature. After more than 6 months no separation of whey was to be observed, and no deterioration in taste could be noted.

EXAMPLE II

The method described in Example I was repeated, but after heating to 90° C. and maintaining the mixture at that temperature for 30 seconds, the mixture was cooled to 30° C. and packed at that temperature. The product was stored in that package at 15° C. The results were similar to those of Example I.

EXAMPLE III

Example I was repeated, except that no fruit essence and sugars were added.

After aseptical packing, the germ count was 92 germs/ml. After more than 6 months' storage no whey separation or sedimentation was to be observed. The fresh yoghurt taste had been fully retained.

EXAMPLE IV

The procedure of Example I was repeated, except that now raspberry essence was used and that now a ΔT of 8° C. was used during the warming-up phase to 51° C. and during the cooling to 32° C. After aseptic packing the germ count of the product was 96 germs/ml. After 6 months' storage at room temperature, no whey separation and no sedimentation were to be observed in this product either. The drink still had the fresh raspberry yoghurt taste.

EXAMPLE V

The procedure of Example I was fully repeated, except that after the last homogenization at a pressure of 20 MPa the yoghurt drink was packed in bottles and subsequently subjected in the package to a heat treatment at 90° C. for 30 seconds, and then cooled to room temperature.

After 6 months' storage at room temperature in the closed package no deterioration in taste and separation of whey were to be observed. The germ count immediately after the heat treatment in the sealed package was 92 germs/ml.

Comparative Example I

The procedure of Example I was repeated, but now a temperature difference of more than 10° C. between the heating medium and the product was used during the warming-up to 51° C. and later during the heating to 90° C. After packing the germ count was 98 germs/ml.

After one month's storage at room temperature, the drink exhibited a clear separation of whey and a visible sedimentation and gave a gritty sensation in the mouth.

Comparative Example II 1000 kg milk was treated in entirely the same way as in Example I, except that after warming-up to 51° C. and cooling to 32° C., without applying homogenization, the product was immediately heated to 90° C., using a temperature difference of 5° C., and after being kept at this temperature for 30 seconds cooled at 22° C. at which temperature it was aseptically packed. The packed product had a germ count of 98 germs/ml.

After one week's storage at room temperature the yoghurt drink was entirely separated into whey and flocs.

Comparative Example III

The procedure of Example I was repeated, but after the first homogenization of the mass it was immediately heated to 90° C., using a temperature difference of 5° C. After being kept at this temperature for 30 seconds, the mass was cooled to 22° C. and packed at this temperature. The yoghurt drink had a germ count of 100 germs/ml. After one week's storage at room temperature, the drink had entirely separated into whey and proteinaceous flocs.

Comparative Example IV

The procedure of Example I was repeated, but after the first homogenization of the mass, it was heated to 65° C. using a ΔT of 5° C., and homogenized at that temperature. Subsequently, using a temperature difference of 5° C., the mass was heated to 90° C. After being kept at this temperature for 30 seconds, the composition was cooled to room temperature and aseptically packed. The germ count of the drink was 95 germs/ml. After one week's storage at room temperature, a clear separation into flocs and whey turned out to have taken place.

Comparative Example V

The procedure of Example I was repeated, but after homogenization of the yoghurt drink it was directly heated to 90° C. while being agitated, and using a temperature difference of 5° C. After the product had reached the temperature of 90° C. it was cooled to 40° C. At this temperature it was homogenized at a pressure of 20 MPa and then aseptically packed. The germ count of the packed product was 96 germs/ml. After being stored at room temperature for 24 days, a whey deposition began to manifest itself in the packed drink.

I claim:

1. A method of producing a predominantly yoghurt beverage, which is storage stable for more than six months and contains about 89 percent of a yoghurt milk product, from a yoghurt milk product, and, optionally, fruit juice, fruit essence, or fruit concentrate, and which is substantially in the absence of pectin and sugar, wherein said yoghurt milk product is prepared by fermenting milk until the mass has reached a pH value conventional for yoghurt, comprising:
    (a) mixing about 89 percent of said yoghurt milk product with relatively minor amounts of ingredients selected from the group consisting of water, sugars, pectin, flavors, and colors, and, optionally, fruit juice, fruit essence, or fruit concentrate;
    (b) homogenizing said mixture;
    (c) subjecting said homogenized mixture to a heat treatment wherein the temperature of said mixture is raised to between 45° and 55° C. while said mixture is being agitated and while maintaining a temperature difference, between said mixture and the heating medium used to raise the temperature of said mixture, of no more than 10° C.;
    (d) subsequently cooling said homogenized heat-treated mixture to a temperature of between 25° and 35° C. while maintaining a temperature difference, between said mixture and the medium used to cool, of no more than about 10° C.;
    (e) performing a second homogenization of said cooled mixture at the temperature reached in step d; and then
    (f) packaging said mixture by a method selected from the group consisting of: pasteurizing, cooling, and aseptically packing said mixture in the appropriate package; and packing said mixture in the appropriate package followed by pasteurizing said mixture while in said package and then cooling said mixture in said package.

2. A method as in claim 1 wherein the temperature of said mixture attained during said heat treatment is 51°±0.5° C.

3. A method as in either claim 1 or 2 wherein the temperature of said mixture reached by said subsequent cooling step is between 31° and 33° C.

4. A method as in either claim 1 or 2 wherein said temperature difference between said mixture and said heating medium is about 5° C.

5. A method as in either claim 1 or 2 wherein said temperature difference between said mixture and said cooling medium is about 5° C.

6. A method as in claim 1 wherein pectin is present in said beverage in an amount of about 0.2% by weight of said beverage.

7. A predominantly yoghurt beverage which is storage stable for more than six months and comprises about 89% of a yoghurt milk product and, optionally, fruit juice, fruit essence, or fruit concentrate, and which is substantially in the absence of pectin and sugar, prepared according to the method of claim 1.

8. The beverage of claim 7 wherein said yoghurt beverage contains at most about 0.2% by weight of pectin.

* * * * *